United States Patent

Yamasaki

Patent Number: 4,676,730
Date of Patent: Jun. 30, 1987

[54] NOZZLE TOUCH MECHANISM

[75] Inventor: Seiji Yamasaki, Hino, Japan

[73] Assignee: Fanuc Ltd., Yamanashi, Japan

[21] Appl. No.: 866,495

[22] PCT Filed: Sep. 12, 1985

[86] PCT No.: PCT/JP85/00511

§ 371 Date: May 7, 1986

§ 102(e) Date: May 7, 1986

[87] PCT Pub. No.: WO86/01768

PCT Pub. Date: Mar. 27, 1986

[30] Foreign Application Priority Data

Sep. 13, 1984 [JP] Japan .................. 59-190472

[51] Int. Cl.$^4$ ........................................... B29C 45/07
[52] U.S. Cl. .................. 425/569; 425/574; 264/328.11
[58] Field of Search .......... 264/328.11; 425/567, 425/569, 574, 142, 311, 313

[56] References Cited

U.S. PATENT DOCUMENTS 3,924,994 12/1975 Aoki ........................ 425/574
4,090,836 5/1978 von der Ohe et al. ........ 425/574

FOREIGN PATENT DOCUMENTS 35969 8/1977 Japan .
179631 10/1983 Japan .

*Primary Examiner*—Jay H. Woo
*Assistant Examiner*—Timothy W. Heitbrink
*Attorney, Agent, or Firm*—Staas & Halsey

[57] ABSTRACT

In a nozzle touch mechanism for urging a nozzle (3) of an injection unit (1) against a mold (4), the mechanism urges and holds the nozzle (3) against the mold (4) through a simple structure. The threaded portion (11a) of the ball screw (11) of the mechanism is engaged with a ball nut (13) fixed to a pressure plate (12) for moving the injection unit (1) through springs (15a, 15b). When a predetermined flexure of the springs (15a, 15b) is generated to urge the nozzle (3) against the mold (4) with an appropriate urging force, the threaded portion (11a) is disengaged from the ball nut (13) at that point. The threaded portion (11a) holds the injection unit (1) at this position and urges and holds the nozzle (3) against the mold (4) by the flexure of the springs (15a, 15b).

8 Claims, 2 Drawing Figures

NOZZLE TOUCH MECHANISM

TECHNICAL FIELD

The present invention relates to a nozzle touch mechanism of an injection molding machine, which urges a nozzle against a mold.

BACKGROUND ART

A nozzle touch mechanism of a conventional injection molding machine hydraulically urges a nozzle against a mold using a hydraulic cylinder. When the nozzle touch mechanism is not driven hydraulically but by a motor, the nozzle must be constantly urged against the mold at a predetermined pressure. For this purpose, a geared motor with a brake is employed. The nozzle is urged against the mold at the predetermined pressure, the motor is braked, and current supply to the motor is simultaneously cut off.

When the nozzle touch mechanism is driven using a geared motor with a brake, a drive current to the motor is cut off and the brake is actuated, thereby stopping the motor. In this case, however, it is difficult to stop the motor at a precise rotating position and to urge the nozzle with an appropriate urging force through the nozzle touch mechanism driven by the motor. In addition, the entire nozzle touch mechanism is expensive.

DISCLOSURE OF INVENTION

It is an object of the present invention to provide an inexpensive motor-driven nozzle touch mechanism wherein an appropriate urging force of the nozzle against the mold is easily set and the nozzle is kept at this position.

In order to achieve the above object, there is provided according to the present invention a nozzle touch mechanism for driving a ball screw with a motor, moving a ball nut engaged with the ball screw and a pressure plate fixed to the ball nut, and moving an injection unit with the pressure plate through a spring, thereby urging a nozzle against a mold by a force generated by flexure of the spring, wherein a threaded portion of the ball screw is formed such that the ball screw is disengaged from the ball nut at a position where a predetermined flexure of the spring is generated to urge the nozzle against the mold at an appropriate urging force.

In this manner, according to the present invention, the ball screw is rotated by the motor, and the pressure plate to which the ball nut is fixed is moved forward, so that the injection unit and the nozzle are moved forward by the spring, thereby urging the nozzle against the mold. In addition, the threaded portion of the ball screw allows the ball screw and the ball nut to be disengaged from each other at a position where an appropriate urging force is generated by a repulsive force caused by the flexure of the spring, i.e., at a position where the compression or the amount of tension on the spring reaches a predetermined value. The ball nut is abutted against the end of the threaded portion of the ball screw, at which point the ball nut is stopped, and the injection unit and the nozzle are also stopped and held thereat. The ball nut cannot then be moved even if the power source of the motor is cut off. Therefore, the predetermined urging force of the nozzle against the mold can be easily set, and the nozzle is held at the predetermined urging force.

In this manner, according to the present invention, only the position for the threaded portion of the ball screw must be accurately designed to stably supply a predetermined urging force with a considerably simple configuration, thereby providing an inexpensive, energy-saving nozzle touch mechanism.

BEST MODE OF CARRYING OUT THE INVENTION

Figure 1:
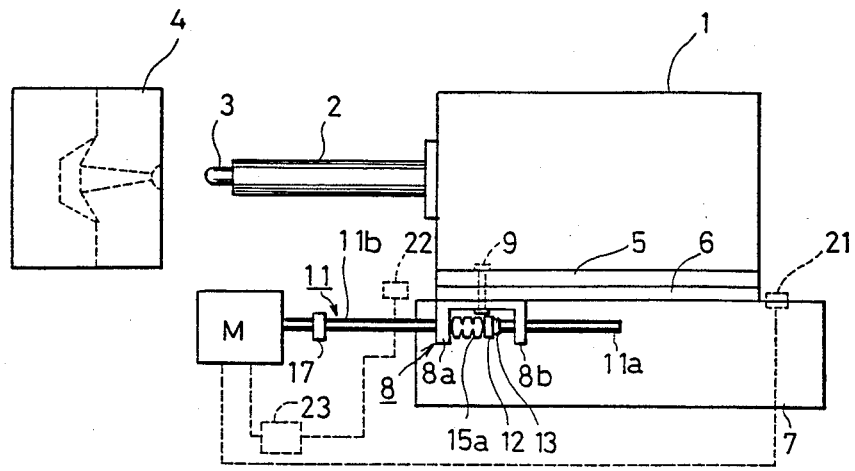
FIG. 1 is a schematic side view of a nozzle touch mechanism with its peripheral arrangement, according to an embodiment of the present invention.
Figure 2:
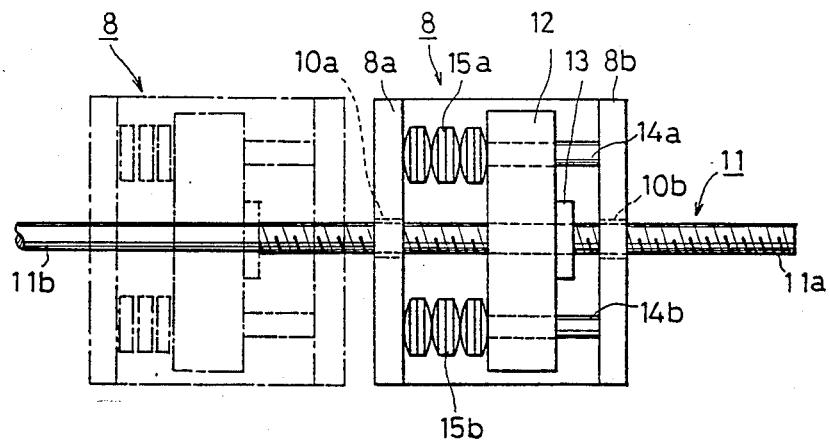
FIG. 2 is a partial enlarged bottom view of a drive member and a ball screw shown in FIG. 1.

FIG. 1 shows an embodiment of the present invention, in which reference numeral 1 denotes an injection unit; 2, a cylinder; 3, a nozzle; and 4, a mold. Reference numeral 5 denotes an injection unit base to which the injection unit 1 is fixed; 6, an extruder base; 7, a slide base; and 8, a drive member. The injection unit base 5, the extruder base 6, and the drive member 8 are integrally connected by a bolt 9, and are slidable on the slide base 7. The drive member 8 has flanges 8a and 8b at its two ends, extending outward from its mount surface to the extruder base 6. As shown in FIG. 2, a ball screw 11 extends through holes 10a and 10b formed in the flanges 8a and 8b. A pressure plate 12, to which a ball nut 13 engaged with the ball screw 11 is fixed, is arranged between the flanges 8a and 8b. Guide rods 14a and 14b extend between the flanges 8a and 8b for slidably supporting and guiding the pressure plate 12. Belleville springs 15a and 15b fitted around the guide rods 14a and 14b, are inserted between the pressure plate 12 and the flange 8a. The ball screw 11 has a threaded portion 11a on a side thereof opposite from that of the mold 4, and a shaft portion 11b on the other side thereof, near the mold 4. The shaft portion 11b is adjacent to and integral with the threaded portion 11a and is not threaded. The diameter of the shaft portion 11b is the same as the smaller diameter of the threaded portion 11a. The shaft portion 11b is coupled through a coupling unit 17 to the motor shaft of a motor M, which is fixed to the base of the injection molding machine.

The boundary position between the threaded portion 11a and the shaft portion 11b of the ball screw 11 is designed such that, when the ball screw 11 is rotated, the injection unit 1 and the like are integrally moved toward the mold 4 along the ball screw 11, and the nozzle 3 is abutted against the mold 4 at an appropriate pressure caused by the flexure of the Belleville springs 15a and 15b, the ball nut 13 and the threaded portion 11a of the ball screw 11 are disengaged from each other.

The operation of this embodiment will now be described.

Assume that the motor M is driven in the forward direction from the state of FIG. 1 in order to rotate the ball screw 11. The ball nut 13 and the pressure plate 12 fixed thereto are moved to the left (to be referred to as forward hereinafter) in FIG. 1. The pressure plate 12 then urges the flange 8a of the drive member 8 through the Belleville springs 15a and 15b, thereby moving the drive member 8 forward. The pressure plate 12 further slidably moves forward the extruder base 6, the injection unit base 5, and the injection unit 1, which are fixed by the drive member 8 and the bolt 9, until the nozzle 3 abuts against the mold 4. When the motor M is further rotated in the forward direction to further move the pressure plate 12, the Belleville springs 15a and 15b are flexed, and the nozzle 3 is urged against the mold 4 by a repulsive force generated by the flexure of the springs 15a and 15b. When the urging force of the nozzle 3 against the mold 4 reaches an appropriate value, the ball nut 13 and the threaded portion 11a of the ball screw 11 are disengaged from each other, resulting in the state indicated by the alternate long and short dashed line in FIG. 2. Therefore, even if the motor M is further rotated, the pressure plate 12 is not moved forward, and the ball screw 11 idles. When the motor is stopped at this position, the thread ridge of the threaded portion 11a of the ball screw 11 is abutted against the end of the ball nut 13, i.e., the ball. The thread ridge is urged against the ball along the axial direction, the pressure plate 12 and the drive member 8 are stopped at this position, and the nozzle 3 is urged against the mold 4 at the appropriate predetermined pressure generated by the flexure of the Belleville springs 15a and 15b and is held thereat.

On the contrary, when the nozzle 3 is removed from the mold 4, the motor M is rotated in the reverse direction. The threaded portion 11a of the ball screw 11 is then engaged with the ball nut 13, and the pressure plate 12 is moved backward (to the right in FIG. 1) to abut against the flange 8b of the drive member 8. After abutment, the pressure plate 12 urges the flange 8b to move the injection unit 1 and the like backward, thereby disengaging the nozzle 3 from the mold 4.

The motor M can be a servo motor. When a general-purpose motor is used, limit switches 21 and 22 for detecting backward and forward positions of the injection unit 1 must be provided, as shown by broken lines in FIG. 1, in order to control the motor. In this case, the position at which the nozzle 3 is abutted against the mold 4 is detected by the limit switch 22, and the motor may then be driven for a predetermined period of time set by a timer 23 or the like until the threaded portion 11a of the ball screw 11 is completely disengaged from the ball nut 13.

I claim:

1. A nozzle touch mechanism for rotating a ball screw via a motor, moving a ball nut engaged with a threaded portion of said ball screw and a pressure plate fixed to said ball nut, and moving an injection unit with said pressure plate through a spring, thereby urging a nozzle of said injection unit against a mold by a force generated by flexure of said spring, characterized in that said threaded portion of said ball screw is formed to be disengaged from said ball nut at a position where a predetermined flexure of said spring is generated to urge said nozzle against said mold at an appropriate urging force.

2. A mechanism according to claim 1, characterized in that said ball screw has said threaded portion on a side thereof opposite from that of said mold and a shaft portion, which is adjacent to and integral with said threaded portion, on a side thereof near said mold, and a boundary between said threaded portion and said shaft portion is set at a position where the predetermined flexure of said spring is generated when said ball nut reaches the boundary.

3. A mechanism according to claim 2, characterized in that a diameter of said shaft portion is designed to be the same as a smaller diameter of said threaded portion.

4. A mechanism according to any of claim 1 characterized in that said nozzle touch mechanism includes a drive member fixed to said injection unit, and said pressure plate is slidably supported by said drive member.

5. A mechanism according to claim 4, characterized in that said drive member has a flange on an end thereof near said mold, and said spring is arranged between said flange and said pressure plate.

6. A mechanism according to claim 5, characterized in that said drive member has a guide rod for slidably supporting said pressure plate, and said spring is fitted around said guide rod.

7. A mechanism according to any of claim 1 characterized in that said motor comprises a servo motor.

8. A mechanism according to any of claim 1 characterized in that a plurality of limit switches for detecting a shift in position of said injection unit and a timer are provided, and said motor is controlled by said plurality of limit switches and said timer.

* * * * *

UNITED STATES PATENT AND TRADEMARK OFFICE
CERTIFICATE OF CORRECTION

PATENT NO. : 4,676,730

DATED : June 30, 1987

INVENTOR(S) : Yamasaki

It is certified that error appears in the above-identified patent and that said Letters Patent is hereby corrected as shown below:

Front page [73], Assignee "Yamamaski" should be --Minamitsura--.

Col. 2, line 33, "15b" should be --15b,--;
line 39, "11a" should be --11a,--.

Col 4, line 24, delete "any of";
line 24, "1" should be --1,--;
line 36, delete "any of";
line 36, "1" should be --1,--;
line 38, delete "any of";
line 38, "1" should be --1,--.

Signed and Sealed this

Tenth Day of May, 1988

*Attest:*

DONALD J. QUIGG

*Attesting Officer*      *Commissioner of Patents and Trademarks*